(12) United States Patent
Xu

(10) Patent No.: US 12,231,594 B1
(45) Date of Patent: Feb. 18, 2025

(54) PHONE SHELL WITH BUILT-IN SCREEN PROTECTOR

(71) Applicant: Yangjiang Guohong Trading Co., Ltd., Yangjiang (CN)

(72) Inventor: Mengting Xu, Yangjiang (CN)

(73) Assignee: Yangjiang Guohong Trading Co., Ltd., Yangjiang (CN)

( * ) Notice: Subject to any disclaimer, the term of this patent is extended or adjusted under 35 U.S.C. 154(b) by 0 days.

(21) Appl. No.: 18/594,368

(22) Filed: Mar. 4, 2024

(51) Int. Cl.
*H04M 1/18* (2006.01)
*H04M 1/03* (2006.01)

(52) U.S. Cl.
CPC ............... *H04M 1/18* (2013.01); *H04M 1/03* (2013.01); *H04M 2250/52* (2013.01)

(58) Field of Classification Search
CPC .......... H04M 1/18; H04M 1/185; H04M 1/03; H04M 2250/52
See application file for complete search history.

(56) References Cited

U.S. PATENT DOCUMENTS

| | | | | |
|---|---|---|---|---|
| 2012/0294469 | A1* | 11/2012 | Weaver, III | H04R 1/2857 381/334 |
| 2019/0386697 | A1* | 12/2019 | Luo | A45C 11/00 |
| 2020/0288833 | A1* | 9/2020 | Fathollahi | A45C 11/00 |
| 2024/0007139 | A1* | 1/2024 | Qiu | H04M 1/04 |

FOREIGN PATENT DOCUMENTS

| | | |
|---|---|---|
| CN | 210469460 U | 5/2020 |
| CN | 112701798 A | 4/2021 |
| CN | 215420375 U | 1/2022 |

OTHER PUBLICATIONS

Wang, CN112123741A, A light and Thin 3D full package plastic mobile phone, Dec. 2020, pp. 1-7 (Year: 2020).*
Guo bo-liang, TW M503034U, Dual section sticks mobile phone case, Jun. 2015, pp. 1-8 (Year: 2015).*
Peng (CN 113507536 A), Mobile phone shell of adapting multiple mobile phone types, Oct. 2021, pp. 1-10 (Year: 2021).*
Xiao (CN 208509029 U), Electronic device protective case, Feb. 2019, pp. 1-4 (Year: 2019).*

* cited by examiner

*Primary Examiner* — Keith Ferguson

(57) ABSTRACT

The present invention relates to a phone shell with a built-in screen protector including a front cover and a back cover. A phone body is wrapped between the front cover and the back cover. A top portion of a front cover frame is provided with a recessed groove, a side wall of a back cover frame extends upward, its top portion is folded inward, and a second flange extending downward is also included. When the front cover is snap-fitted with the back cover, the second flange is inserted into the recessed groove. The front cover frame and a screen protector are integrally molded through plastic injection, preventing the screen protector from falling off.

5 Claims, 8 Drawing Sheets

PHONE SHELL WITH BUILT-IN SCREEN PROTECTOR

TECHNICAL FIELD

The present invention relates to technical field of phone accessories, and in particular to, a phone shell with a built-in screen protector.

BACKGROUND

Currently, electronic devices such as mobile phones are gradually becoming indispensable items in people's daily lives. To prevent the phone body from being contaminated or worn, a consumer usually attaches a protector to a phone screen for protection and wraps the phone body using a phone shell, to prevent the phone body from being scratched and polluted. A conventional phone shell and protector are two separate products.

However, separately buying and using the phone shell and the protector is not economically impractical and causes additional package, causing inconvenient use. In addition, there are various types of protectors and phone shells and compatibility between the two is not good. If the protector is directly attached onto the phone shell, the phone shell cannot fit with the phone screen completely, affecting the sensitivity of the phone screen.

SUMMARY

The present invention provides a phone shell with a built-in screen protector, to resolve the problem in the prior art that when the conventional protector is directly connected to the conventional phone shell, the protector cannot be fixed and the protector cannot fit with the phone screen completely.

The present invention provides a solution to resolve the foregoing technical problem: A phone shell with a built-in screen protector is provided, including a front cover and a back cover connected to the front cover. A phone body is wrapped between the front cover and the back cover. The front cover includes a front cover frame, a side wall of the front cover frame extends downward, a middle portion of the front cover frame is a hollow window, a screen protector is embedded in the hollow window of the front cover, and a top portion of the front cover frame is provided with a recessed groove. The back cover includes a back cover frame, a side wall of the back cover frame extends upward, a top portion of the side wall of the back cover frame is folded inward, and the back cover further includes a second flange extending downward. When the front cover is snap-fitted with the back cover, the second flange is inserted into the recessed groove.

Preferably, an inner side of the side wall of the front cover frame is provided with a first groove, the screen protector is embedded into the first groove, a first flange inclining inward is disposed at a lower end of the side wall of the front cover frame, and the first flange is in contact with the phone body.

Preferably, the back cover frame is provided with a first button portion and a second button portion respectively on left and right sides, and a rear side of the back cover frame is provided with a data cable socket and a sound transmission hole.

Preferably, left and right sides of the front cover frame are respectively provided with a left avoidance opening and a right avoidance opening, a rear side of the front cover frame is provided with a bracket, a bottom portion of the bracket is provided with a notch, the left avoidance opening corresponds to the first button portion, the right avoidance opening corresponds to the second button portion, and the bracket is inserted into the data cable socket.

Preferably, a shielding plate is disposed in the data cable socket of the front cover frame, the shielding plate and the front cover frame are integrated, the shielding plate is capable of fitting with the bracket, when a data cable needs to be connected, the data cable socket of the phone body is capable of being exposed using a finger to toggle the shielding plate, and when the data cable does not need to be connected, the shielding plate is pressed into the bracket using a finger.

Preferably, a dust-proof mesh is disposed outside the sound transmission hole.

Preferably, a middle portion of the back cover frame is a hollow window, and a back protector is embedded into the hollow window of the back cover.

Preferably, an inner side of the side wall of the back cover frame is provided with a second groove, the back protector is embedded into the second groove, and the first groove is of a recessed structure.

Preferably, a bottom side of the back cover frame is provided with a camera accommodating portion, the camera accommodating portion is provided with an accommodating groove, a camera of the phone body fits with the accommodating groove, the camera accommodating portion and the back cover frame are integrated, a side wall of the camera accommodating portion is provided with an embedding groove, and the embedding groove communicates with the second groove.

Preferably, the screen protector and the front cover frame are integrally molded through plastic injection, the back protector and the back cover frame are integrally molded through plastic injection, and the screen protector is a high-definition film or an anti-peek film.

The present invention has the following beneficial effects: The present invention provides a phone shell with a built-in screen protector having the following advantages:

1. The second flange 32 fits with the recessed groove 12, enabling the front cover 1 to be tightly snap-fitted with the back cover 3. In addition, as the first flange 14 inclining inward is disposed at the lower end of the side wall of the front cover frame 11, when the front cover frame 11 is snap-fitted with the back cover frame 31, the first flange 14 goes up to squeeze the phone body 2, to eliminate the gap between the phone screen and the screen protector 4 in the front cover frame 11, ensuring the interactive sensitivity when the user operates the phone on the screen protector 4.

2. The screen protector 4 includes a tempered glass layer and a non-tempered glass layer. The non-tempered glass layer and the first groove 13 of the front cover frame 11 are integrally molded through plastic injection, which is conducive to manufacturing the front cover frame 11 of the built-in screen protector 4, and provides a stable connection between the screen protector 4 and the front cover frame 11, preventing the screen protector 4 from falling off.

3. As the middle portion of the back cover frame 31 is arranged as the hollow window, the back protector 5, which is made of a transparent material, is embedded into the hollow window of the back cover 3. The user views the back surface of the phone body 2 through the back protector 5. Therefore, the arrangement of the back cover improves the aesthetic of the phone shell.

The above description is merely an overview of the technical solution of the present invention. To make the technical means of the present invention more comprehensible and implemented in accordance with the content of the specification, the present invention is described in detail below with reference to the preferred examples of the present invention and accompanying drawings. The specific implementations of the present invention are described with reference to the following embodiments and accompanying drawings.

BRIEF DESCRIPTION OF DRAWINGS

The accompanying drawings described here are used to provide a further understanding of the present invention, and constitute a part of the present invention. The schematic embodiments of the present invention and their descriptions are used to explain the present invention, and do not constitute improper limitations to the present invention. In the accompanying drawings.

In the accompanying drawings, parts represented by numeral references are listed as follows:
1. front cover; 11. front cover frame; 12. recessed groove; 13. first groove; 14. first flange; 15. bracket; 16. left avoidance opening; and 17. right avoidance opening;
2. phone body;
3. back cover; 31. back cover frame; 32. second flange; 33. first button portion; 34. second button portion; 35. camera accommodating portion; 351. accommodating groove; 36. data cable socket; 37. sound transmission hole; 38. shielding plate; 39. second groove; 40. dust-proof mesh;
4. screen protector; and
5. back protector.

DETAILED DESCRIPTION OF THE EMBODIMENTS

The principle and features of the present invention are described with reference to FIGS. 1 to 8, and the examples are only used to explain the present invention instead of limiting the range of the present invention. The present invention is described more specifically using examples with reference to the accompanying drawings in the following paragraphs. According to the following descriptions and claims, the advantages and features of the present invention become clearer. It should be noted that the drawings are simplified and made to a non-accurate scale and only used for conveniently and clearly assisting in describing embodiments of the present invention.

It should be noted that when an assembly is "fixed" on another assembly, it may be directly on the another assembly or via an intermediate assembly. When an assembly is "fixed" to another assembly, it may be fixed to the another assembly directly or via an intermediate assembly. When an assembly is "disposed" on another assembly, it may be disposed on the another assembly directly or via an intermediate assembly. The terms "vertical", "horizontal", "left", "right", and similar expressions used in this specification are solely for explanatory purposes.

Unless otherwise defined, all technical and scientific terms used in the specification have the same meaning as commonly understood by those skilled in the technical field of the present invention. The terms used in the specification of the present invention are merely for describing specific embodiments and not intended to limit the present invention. The term "and/or" used in the specification includes any and all combinations of one or more of the associated listed items.

Embodiment 1

Figure 1:
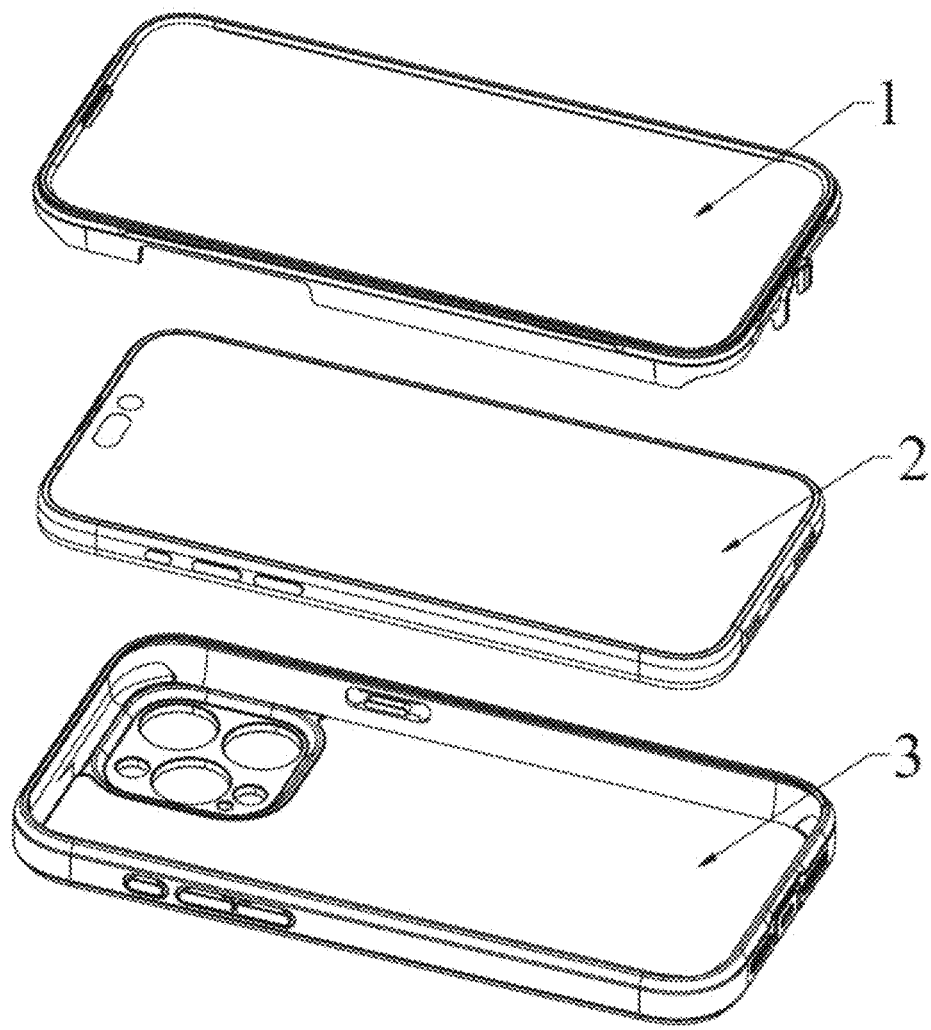
FIG. 1 is a schematic diagram of an entire structure of a phone shell with a built-in screen protector according to the present invention.

As shown in FIG. 1, a phone shell with a built-in screen protector provided by the present invention includes a front cover 1 and a back cover 3 connected to the front cover 1. A phone body 2 is wrapped between the front cover 1 and the back cover 3.

Figure 2:
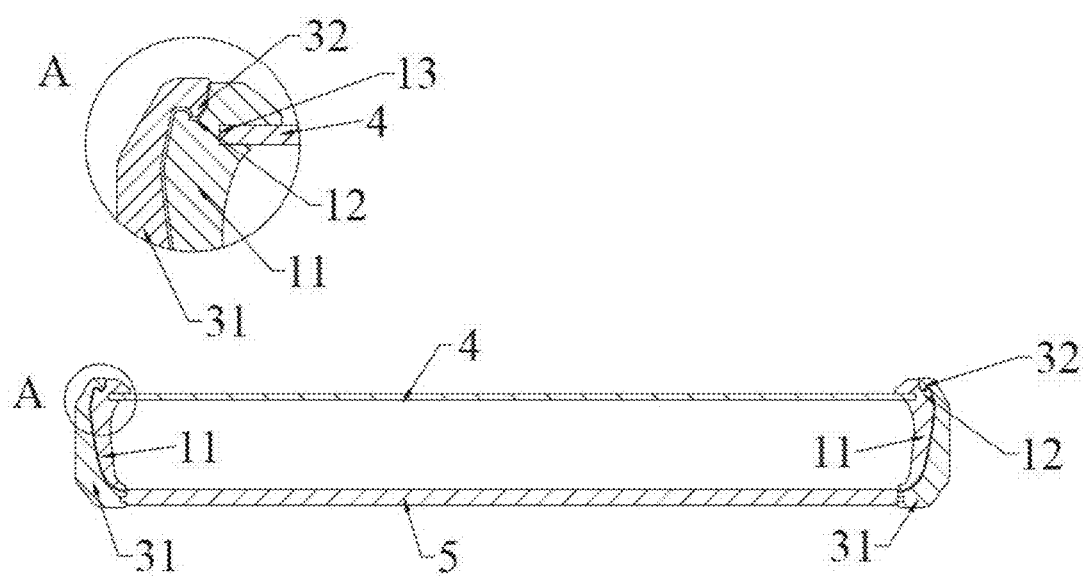
FIG. 2 is a schematic cross-sectional view of a phone shell with a built-in screen protector according to the present invention.
Figure 3:
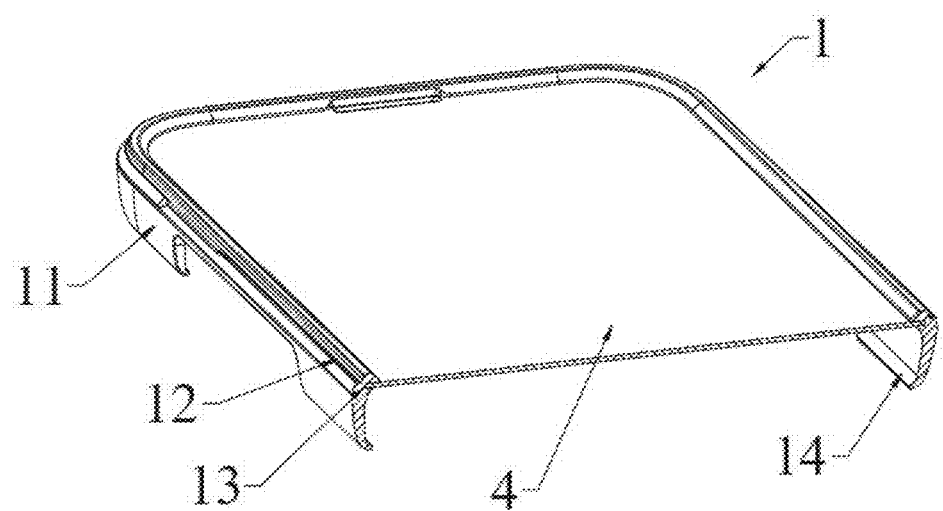
FIG. 3 is a cross-sectional diagram of a front cover of a phone shell with a built-in screen protector according to the present invention.
Figure 4:
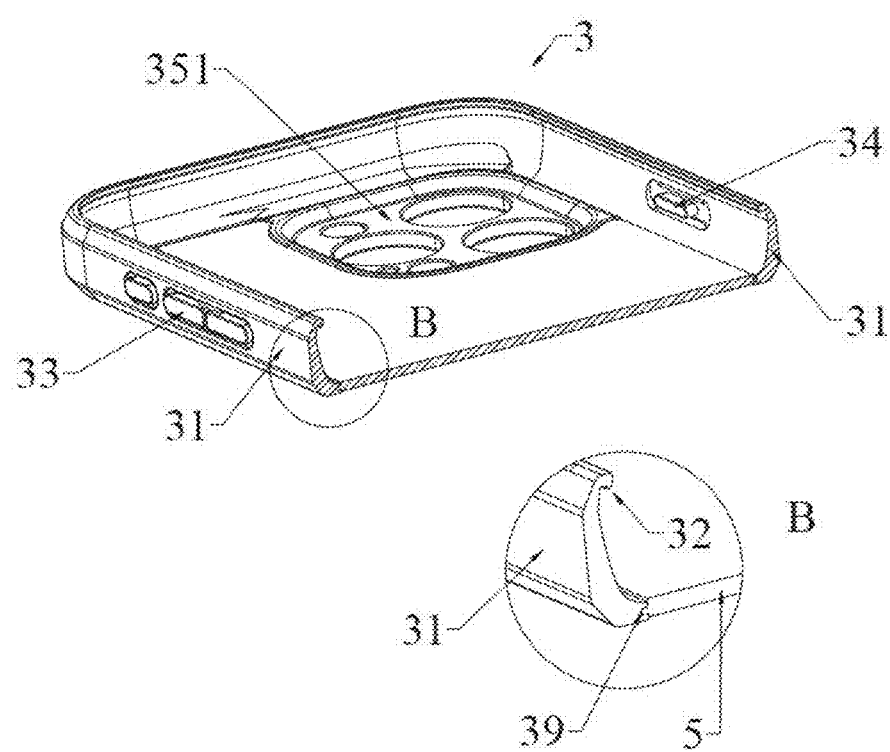
FIG. 4 is a cross-sectional diagram of a back cover of a phone shell with a built-in screen protector according to the present invention.

As shown in FIGS. 2 to 4, the front cover 1 includes a front cover frame 11, and a side wall of the front cover frame 11 extends downward. A middle portion of the front cover frame 11 is a hollow window, and a screen protector 4 is embedded into the hollow window of the front cover 1. A top portion of the front cover frame 11 is provided with a recessed groove 12. The back cover 3 includes a back cover frame 31, a side wall of the back cover frame 31 extends upward, a top portion of the side wall of the back cover frame 31 is folded inward, and the back cover further includes a second flange 32 extending downward. When the front cover 1 is snap-fitted with the back cover 3, the second flange 32 is inserted into the recessed groove 12. The second flange 32 fits with the recessed groove 12, enabling the front cover 1 to be tightly snap-fitted with the back cover 3

In addition, when the phone shell wraps the phone body 2, the front cover 1 wraps the upper portion of the phone body 2, the back cover 3 wraps the lower portion of the phone body 2, the back cover frame 31 wraps the front cover frame 11, and an outer wall of the front cover frame 11 is attached to an inner wall of the back cover frame 31.

To enable the screen of the phone body 2 to be tightly attached to the screen protector 4 in the front cover frame 11, a first flange 14 inclining inward is disposed at a lower end of the side wall of the front cover frame 11, and the first flange 14 is in contact with the phone body 2. When the front cover frame 11 is snap-fitted with the back cover frame 31, the first flange 14 goes up to squeeze the phone body 2, to eliminate the gap between the phone screen and the screen protector 4 in the front cover frame 11, ensuring the interactive sensitivity when the user operates the phone on the screen protector 4.

To conveniently embed the screen protector 4 in the front cover frame 11, an inner side of the side wall of the front cover frame 11 is provided with a first groove 13, and the screen protector 4 is embedded into the first groove 13.

Further, the screen protector 4 may be a high-definition film or an anti-peek film.

To facilitate manufacturing and prevent the screen protector 4 from falling off, the screen protector 4 and the front cover frame 11 are integrally molded through plastic injection. The screen protector 4 includes a tempered glass layer and a non-tempered glass layer. The non-tempered glass layer and the first groove 13 of the front cover frame 11 are integrally molded through plastic injection Further, the first groove 13 is of a recessed structure and four edges of the screen protector 4 are all embedded into the front cover frame 11.

Further, to improve the aesthetic, the middle portion of the back cover frame 31 is arranged as a hollow window, and the back protector 5 is embedded in the hollow window of the back cover 3. To conveniently embed the back cover frame 31 into the back protector 5, an inner side of the side wall of the back cover frame 31 is provided with a second groove 39, and the back protector 5, which is made of a transparent material, is embedded into the second groove 39. The user views the back surface of the phone body 2 through the back protector 5.

Figure 5:
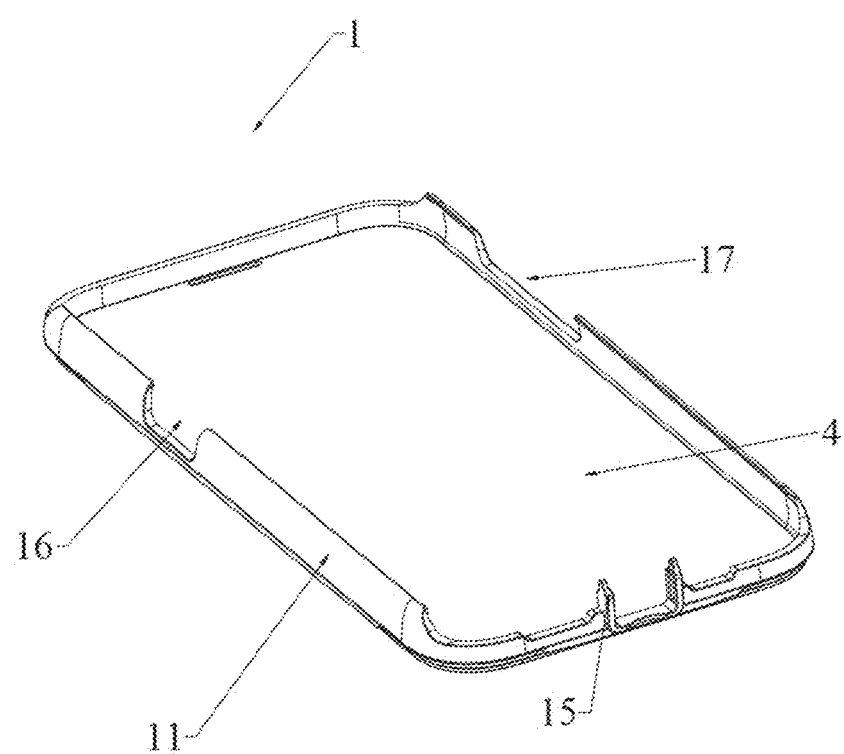
FIG. 5 is a schematic structural diagram of a front cover of a phone shell with a built-in screen protector according to the present invention.

Further, as shown in FIG. 5, the back cover frame 31 is provided with a first button portion 33 and a second button portion 34 respectively on left and right sides, and a rear side of the back cover frame 31 is provided with a data cable socket 36 and a sound transmission hole 37. Correspondingly, left and right sides of the front cover frame 11 are respectively provided with a left avoidance opening 16 and a right avoidance opening 17, a rear side of the front cover frame 11 is provided with a bracket 15, a bottom portion of the bracket 15 is provided with a notch, the left avoidance opening 16 corresponds to the first button portion 33, the right avoidance opening 17 corresponds to the second button portion 34, and the bracket 15 is inserted into the data cable socket 36.

To facilitate protection for the data cable socket of a phone, a shielding plate 38 is disposed in the data cable socket 36 of the front cover frame 11, and the shielding plate 38 and the front cover frame 11 are integrated. The shielding plate 38 has one end connected to the front cover frame 11 and the other end suspended. When the data cable needs to be connected, the data cable socket of the phone body 2 can be exposed using a finger to toggle the shielding plate 38. When the data cable does not need to be connected, the shielding plate 38 is pressed into the bracket 15 using a finger.

Figure 6:
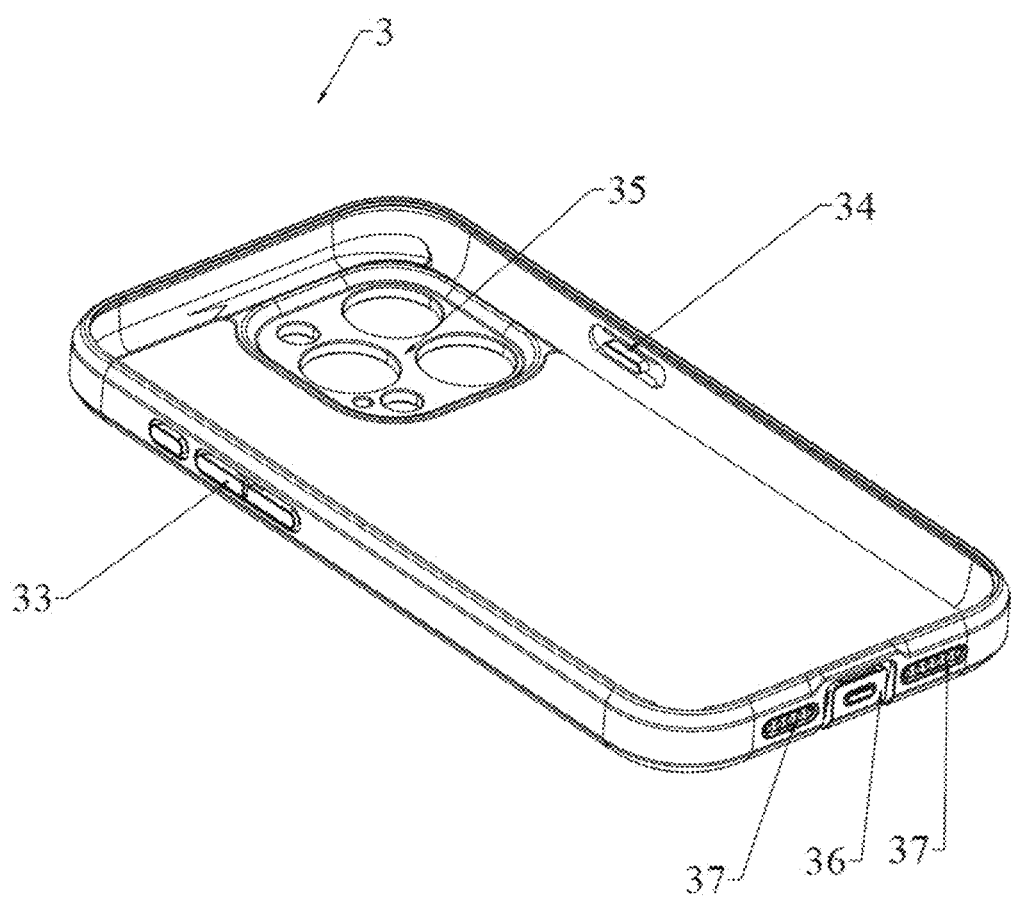
FIG. 6 is a schematic structural diagram of a back cover of a phone shell with a built-in screen protector according to the present invention.

Further, as shown in FIG. 6, a bottom side of the back cover frame 31 is provided with a camera accommodating portion 35, the camera accommodating portion 35 and the back cover frame 31 are integrated, the camera accommodating portion 35 is provided with an accommodating groove 351, and a camera of the phone body 2 fits with the accommodating groove 351.

Further, to facilitate mounting of the back protector 5, the back protector 5 and the back cover frame 31 are integrally molded through plastic injection. In addition, the side wall of the camera accommodating portion 35 is provided with an embedding groove, the embedding groove communicates with the second groove 39, and the back protector 5, the embedding groove, and the second groove 39 are integrally molded through plastic injection.

Embodiment 2

Figure 7:
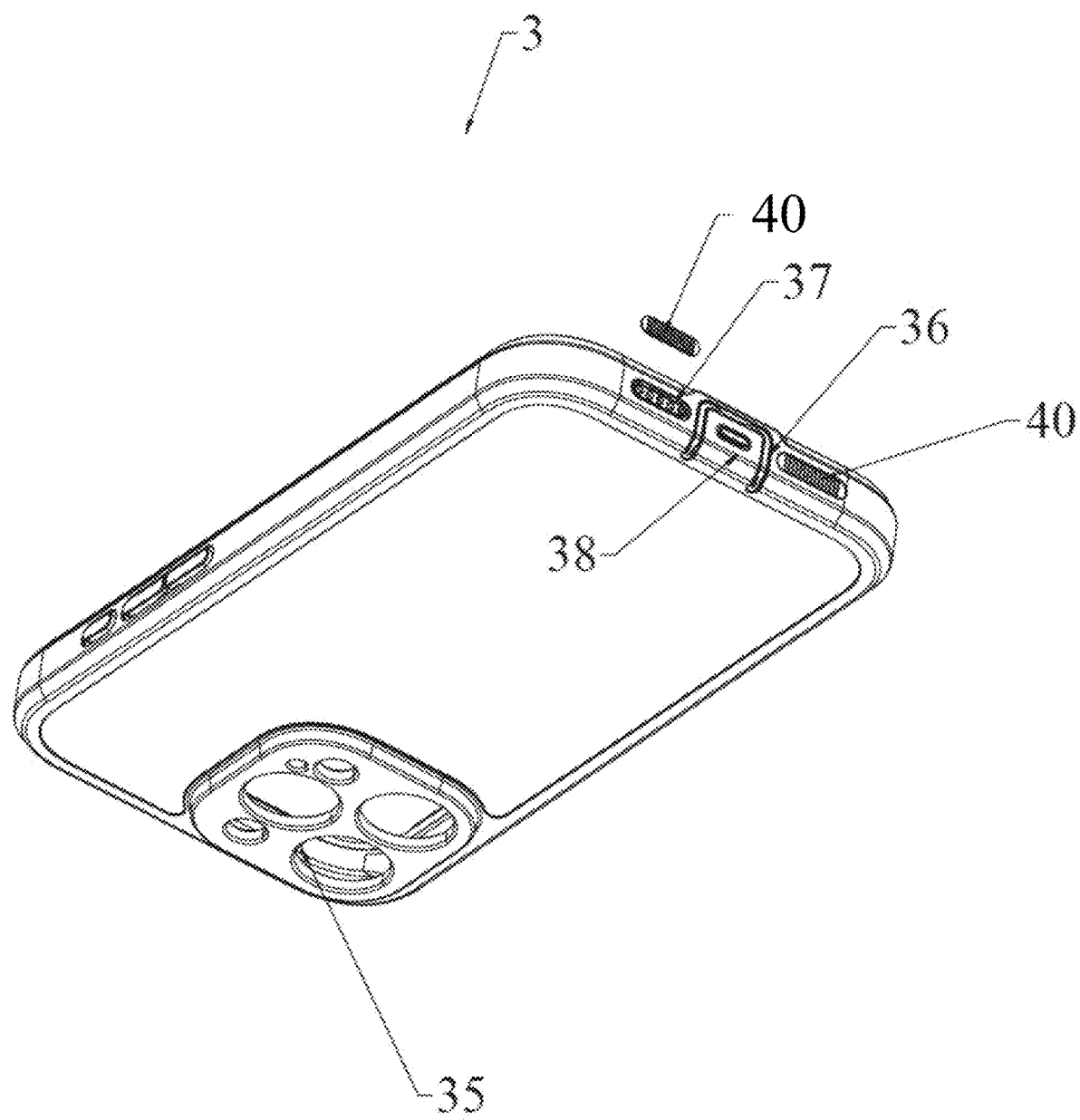
FIG. 7 is another schematic structural diagram of a back cover of a phone shell with a built-in screen protector according to the present invention.
Figure 8:
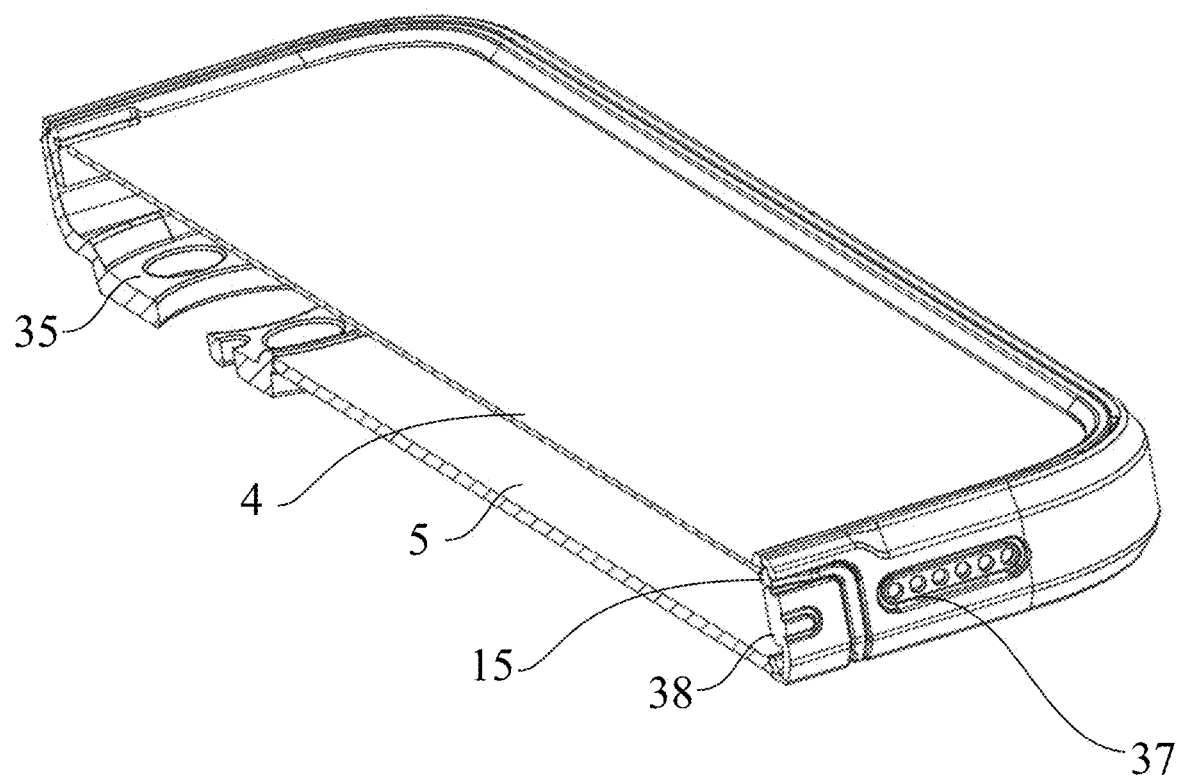
FIG. 8 is a cross-sectional view of an assembled structure of a phone shell with a built-in screen protector according to the present invention.

As shown in FIG. 7, based on Embodiment 1, to prevent large dust particles from entering the sound transmission hole 37, a dust-proof mesh 40 is disposed outside the sound transmission hole 37.

It should be noted that relational terms such as "first" and "second" are only adopted to distinguish one entity or operation from another entity or operation, and are not necessarily required or implied that there is any such actual relationship or order between these entities or operations. The content not detailed in this specification belongs to the prior art known to those skilled in the art.

The above descriptions are merely the preferred embodiments of the present invention and do not limit the present invention in any form. Persons of ordinary skill in the art can smoothly implement the present invention according to the accompanying drawings in this specification and the foregoing descriptions. However, any equivalent changes made by those skilled in the art, such as slight replacements, modifications, and evolutions, within the scope of the technical solution of the present invention based on the foregoing disclosed technical content, are all considered equivalent embodiments of the present invention. In addition, any equivalently changeable replacements, modifications, and evolutions made to the foregoing embodiments based on the essential technology of the present invention still fall within the protection scope of the technical solution of the present invention.

What is claimed is:

1. A phone shell with a built-in screen protector, comprising a front cover and a back cover connected to the front cover, wherein a phone body is wrapped between the front cover and the back cover, wherein the front cover comprises a front cover frame, a side wall of the front cover frame extends downward, a middle portion of the front cover frame is a hollow window, a screen protector is embedded in the hollow window of the front cover, and a top portion of the front cover frame is provided with a recessed groove; and the back cover comprises a back cover frame, a side wall of the back cover frame extends upward, a top portion of the side wall of the back cover frame is folded inward, the back cover further comprises a second flange extending downward, and when the front cover is snap-fitted with the back cover, the second flange is inserted into the recessed groove; and wherein an inner side of the side wall of the front cover frame is provided with a first groove, the screen protector is embedded into the first groove, a first flange inclining inward is disposed at a lower end of the side wall of the front cover frame, and the first flange is in contact with the phone body; and wherein the back cover frame is provided with a first button portion and a second button portion respectively on left and right sides, and a rear side of the back cover frame is provided with a data cable socket and a sound transmission hole; and wherein left and right sides of the front cover frame are respectively provided with a left avoidance opening and a right avoidance opening, a rear side of the front cover frame is provided with a bracket, a bottom portion of the bracket is provided with a notch, the left avoidance opening corresponds to the first button portion, the right avoidance opening corresponds to the second button portion, and the bracket is inserted into the data cable socket; and wherein a shielding plate is disposed in the data cable socket of the front cover frame, the shielding plate and the front cover frame are integrated, one end of the shielding plate is connected to the the front cover frame and another end is suspended; the shielding plate is capable of fitting with the bracket, when a data cable needs to be connected, the data cable socket of the phone body is capable of being exposed using a finger to toggle the shielding plate, and when the data cable does not need to be connected, the shielding plate is pressed into the bracket using a finger; and wherein a dust-proof mesh is disposed outside the sound transmission hole.

2. The phone shell with a built-in screen protector according to claim 1, wherein a middle portion of the back cover frame is a hollow window, and a back protector is embedded into the hollow window of the back cover.

3. The phone shell with a built-in screen protector according to claim 2, wherein an inner side of the side wall of the back cover frame is provided with a second groove, the back protector is embedded into the second groove, and the first groove is of a recessed structure.

4. The phone shell with a built-in screen protector according to claim 3, wherein a bottom side of the back cover frame is provided with a camera accommodating portion, the camera accommodating portion is provided with an accommodating groove, a camera of the phone body fits with the accommodating groove, the camera accommodating portion and the back cover frame are integrated, a side wall of the camera accommodating portion is provided with an embedding groove, and the embedding groove communicates with the second groove.

5. The phone shell with a built-in screen protector according to claim 1, wherein the screen protector and the front cover frame are integrally molded through plastic injection, the back protector and the back cover frame are integrally molded through plastic injection, and the screen protector is a high-definition film or an anti-peek film.

\* \* \* \* \*